(No Model.)

J. R. GROVE.
MILK CAN OR SIMILAR PORTABLE VESSEL.

No. 533,390. Patented Jan. 29, 1895.

WITNESSES:

INVENTOR
Jacob Ross Grove
BY
ATTORNEY

UNITED STATES PATENT OFFICE.

JACOB ROSS GROVE, OF NEW YORK, ASSIGNOR TO THE VACUUM VESSEL AND CAN COMPANY, OF ALBANY, NEW YORK.

MILK-CAN OR SIMILAR PORTABLE VESSEL.

SPECIFICATION forming part of Letters Patent No. 533,390, dated January 29, 1895.

Application filed March 7, 1894. Serial No. 502,783. (No model.)

*To all whom it may concern:*

Be it known that I, JACOB ROSS GROVE, a citizen of the United States, and a resident of the city, county, and State of New York, have invented certain new and useful Improvements in Milk-Cans or Similar Portable Vessels, of which the following is a specification.

The present invention has reference to transportable vessels intended to contain liquids or articles affected by changes of temperature and the said invention consists in the portable can or vessel hereinafter described and set forth, whereby a simple and effective construction is provided for the purpose stated, that will protect the contents from the deteriorating action of varying temperatures and at the same time be in itself a complete structure and comparatively inexpensive of production.

Figure 1:
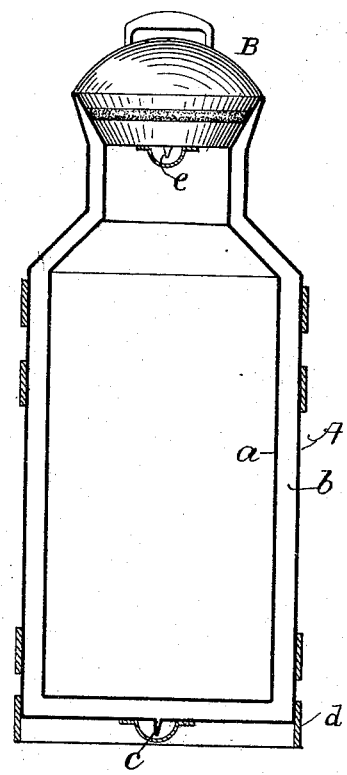
Figure 2:
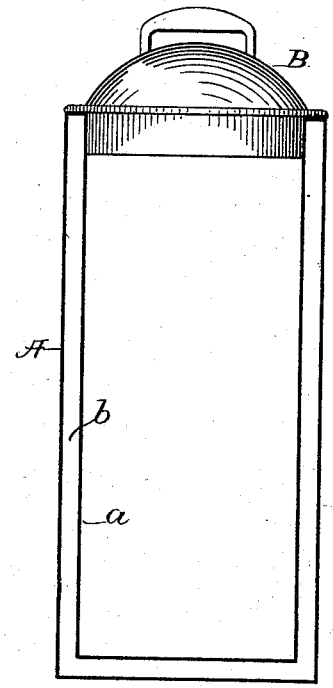
Figure 3:
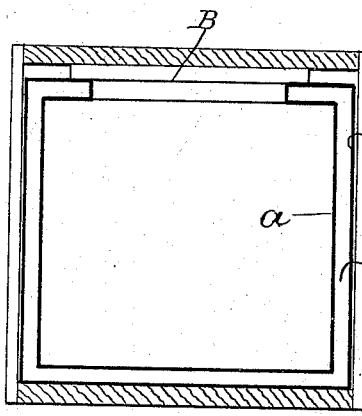

In the accompanying drawings forming part of this specification: Figure 1. is a vertical sectional view of a milk can embodying my improvements. Fig. 2. is a like view showing the invention in connection with an ice cream vessel, and Fig. 3. is an additional vertical sectional view showing rectangular structure involving my improvements.

Prior to my present invention many attempts have been made to protect the interior of a transportable packing or storing vessel from the effects of the atmosphere. In some instances, such vessels have been jacketed or double walled so as to provide a protecting air space but experience has proved that while the confined air answered for a limited period, when the outer wall or shell became heated, the temperature of the air within the space became elevated so that all the objections and disadvantages incident to the common form of vessel, then came into being.

It is known that the heat conductivity of a partial vacuum or a vacuum is very low. This is exemplified for instance in the incandescent electric lamp of commerce, wherein, although the filament incandesces to a very high degree, its heat, owing to the absence of air within the bulb is not radiated nor transmitted to the bulb. My invention is predicated on these facts and provides a portable vessel designed for the reception of liquids or solids and their maintenance at a lower degree of temperature than that of the external atmosphere; by means of a partial vacuum or vacuum space surrounding the chamber or compartment in which the liquid or solid is to be contained. In some cases, it will suffice if the cover or closure of the vessel has a close joint or seat; otherwise it will be desirable to provide the cap or cover with a partial vacuum or vacuum space.

In constructing a milk can or similar vessel, the inner vessel *a*, may be made of any light or cheap sheet metal having the joints air tight. This vessel *a*, is incased by an outer vessel A, which for the sake of durability is preferably made of galvanized sheet metal and has its joints calked or soldered to make them absolutely air tight. This vessel A, is permanently connected with the inner vessel *a*, by means of air tight joints so as to form the intermediate space *b* enveloping the inner vessel *a*. The vacuum or partial vacuum is permanently secured in this space through the medium of a vacuum pump, the chamber *b*, being sealed by having a soft metal tube connected with the bottom of the vessel A, so as to place the space *b*, in communication with the exhaust of the pump, the tube being closed close to said bottom and practically rendered homogeneous thereat by heat and pressure, after which the tube beyond the closed portion is severed so as to leave a short closed teat *c*, on the vessel bottom. Generally the bottom band *d*, extending beyond the bottom to form the bearing will sufficiently guard or protect the teat *c*, but should it be otherwise, the necessary protection can be supplied by employing a metallic cap or guard soldered to the can bottom to protect the teat. When necessary, the cap or closure B, will be provided with a vacuum space sealed by means of a teat *e*.

In practice, it will be found that milk placed in the vessel *a*, at a lower temperature than the external atmosphere, will retain its temperature with but slight variation for a considerable period, since the space *b*, presents a guard or protecting medium of an indifferent heat conducting quality. Milk cans constructed as described will be specially valuable in transportation, as they will serve to keep the milk in a fresh and cool condition throughout and after the period of transit.

In cases where it is not possible to secure a complete vacuum, it is desirable to carry out the purposes of this invention that the air in the space $b$, should be considerably less in pressure than that of the surrounding atmosphere.

I am aware that it is not novel to place vessels containing milk into an air tight chamber, exhausting the air from said chamber, causing the gases to escape from the milk and assisting in bringing cream to the surface of the milk, and I therefore do not claim such construction.

I claim—

1. The combination in a milk can or similar vessel, of the inner and outer vessels permanently secured together to present the intermediate air tight space from which the air is exhausted to present a surrounding vacuum chamber for the inner vessel, a sealing teat for said vacuum chamber, a guard for said teat, and a cover containing a vacuum space for hermetically closing the mouth of the inner vessel, substantially as set forth.

2. In a vacuum vessel or can, the combination of an interior chamber, a jacket surrounding said interior chamber, a space between said jacket and said chamber and non-communicating with said chamber, a cover for closing said jacket and simultaneously hermetically sealing said interior chamber, a vacuum in the space between said jacket and said interior chamber, substantially as described and for the purpose set forth.

In testimony that I claim the foregoing as my invention I have signed my name, in presence of two witnesses, this 3d day of March, 1894.

JACOB ROSS GROVE.

Witnesses:
WILLIAM PAXTON,
H. VARICK BOSWELL.